(12) United States Patent
Lauer et al.

(10) Patent No.: US 8,644,362 B1
(45) Date of Patent: Feb. 4, 2014

(54) HYBRID PSEUDO-RANDOM NOISE AND CHAOTIC SIGNAL IMPLEMENTATION FOR COVERT COMMUNICATION

(75) Inventors: Robert Lauer, Bryn Mawr, PA (US); Peter Shaw, Philadelphia, PA (US)

(73) Assignee: The SI Organization, Inc., King of Prussia, PA (US)

( * ) Notice: Subject to any disclaimer, the term of this patent is extended or adjusted under 35 U.S.C. 154(b) by 329 days.

(21) Appl. No.: 13/224,089

(22) Filed: Sep. 1, 2011

(51) Int. Cl.
*H04B 1/707* (2011.01)

(52) U.S. Cl.
USPC .......................................................... 375/141

(58) Field of Classification Search
USPC .................................. 375/140, 141, 146, 147
See application file for complete search history.

(56) References Cited

U.S. PATENT DOCUMENTS

| | | | |
|---|---|---|---|
| 5,048,086 A | 9/1991 | Bianco et al. | |
| 5,321,409 A | 6/1994 | Walker | |
| 5,379,346 A | 1/1995 | Pecora et al. | |
| 5,404,298 A | 4/1995 | Wang et al. | |
| 5,432,697 A | 7/1995 | Hayes | |
| 5,655,022 A | 8/1997 | Carroll | |
| 5,680,462 A | 10/1997 | Miller et al. | |
| 5,696,826 A | 12/1997 | Gao | |
| 5,751,811 A | 5/1998 | Magnotti et al. | |
| 6,014,445 A | 1/2000 | Kohda et al. | |
| 6,018,582 A | 1/2000 | Francois et al. | |
| 6,104,703 A | 8/2000 | Sobiski et al. | |
| 6,127,899 A | 10/2000 | Silva et al. | |
| 6,178,217 B1 | 1/2001 | Defries et al. | |
| 6,216,093 B1 | 4/2001 | Corron et al. | |
| 6,236,862 B1 | 5/2001 | Erten et al. | |
| 6,310,906 B1 | 10/2001 | Abarbanel et al. | |
| 6,363,153 B1 | 3/2002 | Parker et al. | |
| 6,744,893 B1 | 6/2004 | Fleming-Dahl | |
| 6,854,058 B2 | 2/2005 | Carroll | |
| 6,980,656 B1 | 12/2005 | Hinton, Sr. et al. | |
| 6,999,445 B1 | 2/2006 | Dmitriev et al. | |
| 7,010,126 B1 | 3/2006 | Kim | |
| 7,054,446 B2 | 5/2006 | Ishihara et al. | |
| 7,072,469 B1 | 7/2006 | Oudaltsov et al. | |
| 7,076,065 B2 | 7/2006 | Sherman et al. | |
| 7,110,547 B2 | 9/2006 | Short | |
| 7,142,617 B2 | 11/2006 | Mohan | |
| 7,170,997 B2 | 1/2007 | Petersen et al. | |

(Continued)

FOREIGN PATENT DOCUMENTS

EP  0872975 A2  10/1998
EP  1971070 A1  9/2008

(Continued)

OTHER PUBLICATIONS

Jeruchim et al., Simulation of Communication Systems: Modeling Methodology and Techniques, Kluwer Academic Publishers, New York, NY (Copyright 2002), 2nd Ed., p. 236.

*Primary Examiner* — Kevin Kim
(74) *Attorney, Agent, or Firm* — Pepper Hamilton LLP (57) ABSTRACT

A method and system for covert communication is provided by using a hybrid approach of pseudo-random noise (PN) sequencing with chaotic signals to make a transmitted waveform both hard to detect and hard to intercept by an unintended receiver. The method and system makes a covert communication system with chaotic signals practical for in-field use, including operation in a high noise power environment and allowing for easily changing between different security keys to maintain covertness.

23 Claims, 5 Drawing Sheets

(56) References Cited

U.S. PATENT DOCUMENTS

| | | | |
|---|---|---|---|
| 7,795,983 | B1 | 9/2010 | Delaney et al. |
| 7,813,433 | B2 | 10/2010 | Moffatt |
| 2005/0089169 | A1* | 4/2005 | Kim et al. ............ 380/263 |
| 2005/0180522 | A1 | 8/2005 | Carroll |
| 2006/0109890 | A1* | 5/2006 | Willenegger ............ 375/146 |
| 2008/0107268 | A1 | 5/2008 | Rohde et al. |
| 2008/0198832 | A1 | 8/2008 | Chester |
| 2010/0310072 | A1 | 12/2010 | Michaels et al. |

FOREIGN PATENT DOCUMENTS

| | | |
|---|---|---|
| EP | 2230794 A2 | 9/2010 |
| JP | 6104793 A | 4/1994 |
| JP | 2000252751 A | 9/2000 |
| JP | 2001156773 A | 6/2001 |
| JP | 2001285279 A | 10/2001 |
| WO | WO 02/065386 A1 | 8/2002 |
| WO | WO 03/021863 A1 | 3/2003 |
| WO | WO 2006/065084 A1 | 6/2006 |
| WO | WO 2010/034728 A1 | 4/2010 |

* cited by examiner

HYBRID PSEUDO-RANDOM NOISE AND CHAOTIC SIGNAL IMPLEMENTATION FOR COVERT COMMUNICATION

BACKGROUND

The present disclosure relates generally to covert communication systems to send signals to intended users in such a way so as to minimize the ability of an unintended receiver from detecting or intercepting the signal.

In the field of covert communications, transmissions may be typically identified under one of three categories: 1. Low Probability of Detection (LPD); 2. Low Probability of Interception (LPI); and 3. Low Probability of Exploitation (LPE).

LPD is the characteristic of a signal that prevents an unauthorized receiver from detecting the presence of the signal. This non-detection is commonly achieved by transmitting a signal at a low enough power density to hide in or under the noise floor.

LPI is the characteristic of a signal that prevents an unauthorized receiver from capturing a previously detected signal. This non-capturing is commonly achieved by spreading the signal's energy over a wider bandwidth than is necessary for ordinary communications, thus making direct reception of the signal impractical by an unauthorized receiver without knowledge of the spreading mechanism.

LPE is the characteristic of a signal that prevents a captured signal from being exploited by an unauthorized receiver. Non-exploitation is commonly achieved through the use of data encryption.

In one way, a signal is made to be covert, with LPD and LPI characteristics, by spreading the original non-covert signal with a pseudo-random noise (PN) sequence. The original signal is multiplied by a waveform of chips, wherein each chip is a pulse that is either positive or negative representing the binary value (1 or 0) of the PN sequence. Because the chip rate is higher than that of the original signal's data rate, the effect is that the resulting signal's energy is spread over a wider bandwidth than the original signal alone. Since the energy is constant, the relative height of the spectrum is reduced allowing the signal to "hide" in or under the noise.

Many methods exist for exploiting the structure of a pseudo-random noise (PN) sequence to better detect and de-spread the signal. Once the de-spreading is complete, ordinary signal reception is possible leaving the information in the signal vulnerable for exploitation. A layer of encryption can protect the main information content of the signal but often these algorithms require header information and other structures that can still be exploited by an unintended receiver without requiring sophisticated methods for breaking the encryption scheme.

Attempts to make signals covert may also utilize chaotic signal generation. A chaotic signal is generated from a system that displays properties of chaos. Although there is no generally agreed upon standard definition of chaos, properties that are required include deterministic behavior (as opposed to random behavior) that is sensitive to initial conditions such that the long term evolution of the system cannot be predicted. Essentially, despite being deterministic, a chaotic system's future is nearly impossible to predict. A result of this property is that if the characteristics (e.g. coefficients) are different between two chaotic systems of identical structure then the two systems will diverge rapidly even when the difference is small. This makes characterizing a chaotic system from an output chaotic signal extremely challenging. But this also makes a chaotic system useful for LPI systems, because after applying the chaotic signal to the desired message it is nearly impossible to regenerate chaos without knowing ahead of time the exact characteristics of the original chaotic system. These characteristics become the "security key."

What is needed is a device and process to effectively communicate signals covertly having LPD and LPI characteristics without being corrupted by noise during transmission. The device and process would need to be used in realistic field environments, and not for example requiring a clock for synchronization between transmitter and receiver. What is also needed is for synchronization to not have to occur after the transmission of every bit, which ultimately affects data throughput. What is also needed is that the device be not susceptible to a statistical analysis by an unintended receiver to predict the information transmitted. What is also needed in the field is the capability to separate the device, or hardware, from the "security key" so that physical components do not need to be replaced to change the characteristics of the chaos.

SUMMARY

Embodiments of this disclosure provide a device and process to covertly communicate using PN sequencing with chaos.

Embodiments of this disclosure are directed to a covert communication system including a transmitter for sending a covert signal a receiver for receiving the covert signal. The transmitter includes a modulator to modulate a data signal entering the transmitter to create a transmitter modulated signal. The transmitter also includes a first transmitter multiplying device coupled to the modulator to multiply the transmitter modulated signal with a chaotic signal to create a chaotic modulated signal. The transmitter also includes a transmitter chaos generator coupled to the first multiplying device to generate the chaotic signal. The chaotic modulated signal reenters the transmitter chaos generator. The transmitter also includes a transmitter pseudo-random noise sequence generator to generate a transmitter pseudo-random noise sequence. The transmitter also includes a second transmitter multiplying device coupled to the first multiplying device and to the transmitter pseudo-random noise sequence generator to multiply the chaotic modulated signal with the transmitter pseudo-random noise sequence to create the covert signal. The receiver includes a receiver pseudo-random noise sequence generator to generate a receiver pseudo-random noise sequence identical to the transmitter pseudo-random noise sequence. The receiver also includes a first receiver multiplying device coupled to the receiver pseudo-random noise sequence generator to multiply the covert signal with the pseudo-random noise sequence to create a de-spread signal. The receiver also includes a receiver chaos generator coupled to the first receiver multiplying device to generate a receiver chaotic signal. The receiver chaos generator is of similar configuration as the transmitter chaos generator. The de-spread signal enters the receiver chaos generator. The receiver also includes a complex conjugate device coupled to the receiver chaos generator to complex conjugate the receiver chaotic signal to generate a conjugated signal. The receiver also includes a second receiver multiplying device coupled to the first receiver multiplying device and the complex conjugate device to multiply the conjugated signal to the de-spread signal to create a receiver modulated signal. The receiver also includes a demodulator coupled to the second receiver multiplying device to demodulate the receiver modulated signal to generate a received data signal approximating the data signal entering the transmitter.

According to one embodiment, the receiver further includes a pseudo-random noise sequence synchronization device. The pseudo-random noise sequence synchronization device includes a delay device. The pseudo-random noise sequence synchronization device also includes a supplement complex conjugate device. The pseudo-random noise sequence synchronization device also includes a complex multiply algorithm. The pseudo-random noise sequence synchronization device determines a delay necessary to synchronize the receiver pseudo-random noise sequence with the transmitter pseudo-random noise sequence.

According to another embodiment, the transmitter chaos generator further includes a non-linear device to receive the chaotic signal and generate a filtered signal. The transmitter chaos generator also includes a buffer coupled to the non-linear device to sample the filtered signal to generate sampled signals. The transmitter chaos generator also includes a selection device coupled to the buffer for selecting from sampled signals to generate a selected sampled signal. The transmitter chaos generator also includes an integrator coupled to the selection device to solve differential equations with variable coefficients for state variables as a function of the selected sampled signal to generate an integrated signal. The transmitter chaos generator also includes a variable gain control coupled to the integrator to scale the integrated signal. The transmitter chaos generator also includes a numerically controlled oscillator coupled to the variable gain control to generate a constant amplitude and varying phase within the chaotic signal.

According to one aspect of one embodiment, the non-linear device includes a first filter. The non-linear device also includes an instantaneous nonlinear function coupled to the first filter. The non-linear device also includes a second filter coupled to the instantaneous nonlinear function. According to one aspect of one embodiment, the first filter is selected from a finite impulse response filter or an infinite impulse response filter. According to another aspect of one embodiment, the second filter is selected from a finite impulse response filter or an infinite impulse response filter. According to another aspect of one embodiment, the instantaneous nonlinear function is a square law device. According to another aspect of one embodiment, the instantaneous nonlinear function is a lookup table device.

According to another embodiment, the transmitter chaos generator is digitally programmable.

According to another embodiment, the complex conjugate device is digital.

According to another embodiment, the modulator is selected from a minimum shift keying modulator, a staggered quadrature phase shift keying modulator, or a modulator with different amplitude and phase shift keying.

According to another embodiment, the transmitter further comprises an encoder coupled to the modulator for encoding the data signal before the data signal is modulated. The receiver further includes a decoder coupled to the demodulator to decode the demodulated waveform to generate a decoded waveform.

According to one aspect of one embodiment, the encoder is selected from a Reed-Solomon encoder, a convolutional encoder, a LDPC/BCH encoder, or a Turbo Code encoder. According to one aspect of one embodiment, the decoder is selected from a Reed-Solomon decoder, convolutional decoder, a hard decision Viterbi algorithm decoder, a soft-decision Viterbi algorithm decoder, a LDPC/BCH decoder, or a Turbo Code decoder. According to one aspect of one embodiment, the transmitter further comprises an encryption device coupled to the encoder for encrypting the data signal before encoding and wherein the receiver further comprises a decryption device coupled to the decoder to decrypt the decoded waveform.

According to one aspect of one embodiment, the transmitter further comprises an analog-to-digital converter coupled to the modulator to convert the data signal from analog to digital and a digital-to-analog converter coupled to the numerically controlled oscillator to convert the chaotic signal from digital to analog.

According to another embodiment, the transmitter further comprises a carrier frequency generator device coupled to the second transmitter multiplying device to transmit the covert signal on a carrier frequency. The receiver further includes a carrier frequency recovery device to remove the carrier frequency from the covert signal.

According to another embodiment, the selection device is selected from a multiplexer or a summation device.

Embodiments of this disclosure are also directed to a method for covertly communicating between a transmitter and a receiver including receiving a data signal at the transmitter. The method also includes modulating the data signal at a modulator in the transmitter to create a transmitter modulated signal. The method also includes generating a chaotic signal from a transmitter chaos generator in the transmitter. The method also includes multiplying the modulated signal with the chaotic signal in the transmitter to create a transmitter chaotic carrier signal. The method also includes generating a transmitter pseudo-random noise sequence from a transmitter pseudo-random noise sequence generator in the transmitter. The method also includes multiplying the transmitter chaotic carrier signal to the transmitter pseudo-random noise sequence in the transmitter to create a covert signal. The method also includes transmitting the covert signal over a channel from the transmitter. The method also includes receiving the covert signal transmitted from the transmitter over the channel at the receiver. The method also includes generating a receiver pseudo-random noise sequence from a receiver pseudo-random noise sequence generator identical to the transmitter pseudo-random noise sequence. The method also includes multiplying the receiver pseudo-random noise sequence to the covert signal in the receiver to create a de-spread signal. The method also includes generating a receiver chaotic carrier signal at a receiver chaos generator. The receiver chaos generator is of similar configuration as the transmitter chaos generator. The method also includes complex conjugating the receiver chaotic carrier signal from the receiver chaos generator at a complex conjugate device to generate a conjugated signal in the receiver. The method also includes multiplying the conjugated signal to the de-spread signal to create a receiver modulated waveform. The method also includes demodulating the receiver modulated waveform at a demodulator in the receiver to generate a received data signal approximating the data signal received at the transmitter.

According to one embodiment, generating a chaotic signal from the transmitter chaos generator in the transmitter further includes receiving the chaotic signal at a non-linear device in the transmitter chaos generator. Generating a chaotic signal also includes filtering the chaotic signal at the non-linear device to create a filtered signal. Generating a chaotic signal also includes sampling the filtered signal at a digital buffer in the transmitter chaos generator. Generating a chaotic signal also includes selecting from the sampled signals at a selection device to generate a selected sampled signal. Generating a chaotic signal also includes integrating the selected sample signal at an integrator for solving differential equations with variable coefficients for state variables as a function of the selected sampled signal to generate an integrated signal. Generating a chaotic signal also includes scaling the integrated signal at a variable gain control. Generating a chaotic signal also includes generating a constant amplitude and varying phase in the chaotic signal at a numerically controlled oscillator.

According to one aspect of one embodiment, integrating the selected sample signal further comprises solving for Lorenz differential equations. According to another aspect of one embodiment, integrating the selected sample signal further comprises integrating with trapezoidal differential equations. According to another aspect of one embodiment, integrating the selected sample signal further comprises integrating under Simpson's rule for differential equations.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of this disclosure are best understood from the following detailed description when read in connection with the accompanying drawings. For the purpose of illustrating the disclosure, there is shown in the drawings embodiments that are presently preferred, it being understood, however, that the disclosure is not limited to the specific instrumentalities disclosed. Included in the drawings are the following Figures.

DETAILED DESCRIPTION OF ILLUSTRATIVE EMBODIMENTS

This document describes a system and process to create a covert waveform in communication transmission and reception using hybrid PN sequencing with chaos. The system and process add an additional layer of protection to the covert communication scheme that enhances the LPI characteristics of the signal beyond what a PN sequence can provide. This enhancement is achieved through the use of a chaotic signal implemented in conjunction with the PN sequence.

Chaotic signals impede direct detection of the modulated data in a transmitted waveform by adding an extra layer of modulation. Without undoing this layer of modulation or even with only a partial undoing of the layer, low enough bit error rates for effective communication are not possible. This allows for protection of data structures such as frame headers or the use of more complex forward error correction schemes that could be exploited in a traditional PN sequence-only covert communication system.

In this system and method, the PN sequence spreads the transmitted signal's energy out over a wider bandwidth to make detection harder and also lowers the noise power seen by a chaos generator in a receiver to a low enough level to successfully synchronize the chaos at signal to noise ratios (SNR) that support practical data rates. Previous inventions in this area have suffered from requiring SNR too high to support communication and negated the low probability of detection benefit. The PN sequence is used to spread the signal out to make its energy density lower, but if an unintended receiver de-spreads the signal, the unintended receiver must still undo the effects of the chaotic signal before exploiting the structure of the ordinary data signal and/or attempting to break the encryption scheme. The system and process further described below does not completely replace the PN sequence for spreading, but instead complements the PN sequence, because chaotic systems have issues with synchronization in high noise environments making them impractical alone as a spreading mechanism. In this disclosure, the use of the PN sequence for de-spreading allows the chaotic system to operate in a suitable noise environment that does not exhibit poor synchronization.

Figure 1:
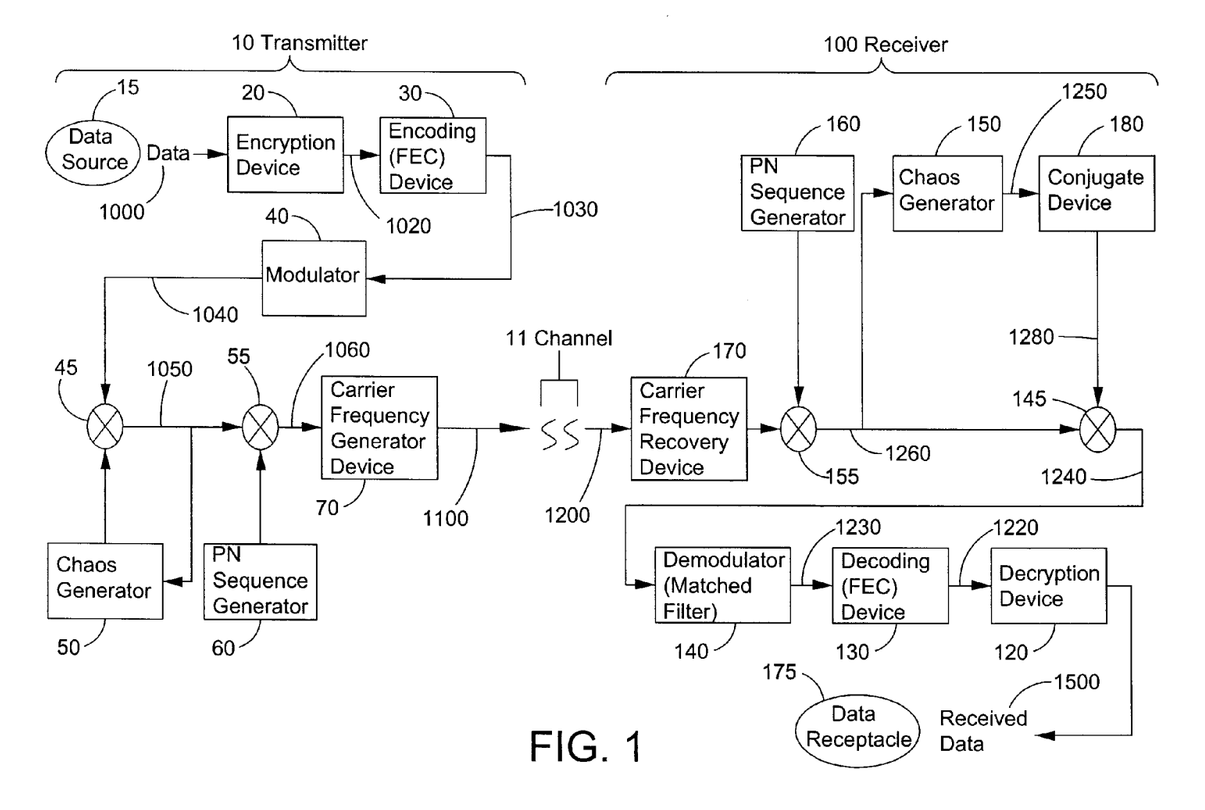
FIG. 1 illustrates an exemplary system and method for implementing a covert communication in at least one embodiment.

FIG. 1 illustrates an exemplary system and method for implementing a covert communication in at least one embodiment. FIG. 1 shows a transmitter 10, which takes in data 1000 from a data source 15 and converts the signal as a transmitted waveform 1100. The transmitted waveform 1100 is transmitted over a channel 11 to arrive at receiver 100 as a received waveform 1200. The receiver 100 converts the received waveform 1200 into received data 1500 to a data receptacle 175. Channel 11 is any medium in which a waveform may be passed, such as atmosphere. The receiver 100 performs algorithms on the received waveform 1200 so as to output received data 1500 which is approximate to the data 1000 entering the transmitter 10.

The exemplary structure of the transmitter 10 is shown in FIG. 1. The data 1000 entering the transmitter 10, and to be transmitted, is first represented in binary (1 or 0). The data may be either plaintext or an encrypted message. The originating data message itself may need not be binary and any conversion to binary may occur outside or within the transmitter 10 (not shown). In some embodiments, the data source 15 is a non-binary message source with a converter to convert to binary data integrated within, before entering the transmitter 10, and with a corresponding reverse-converter at the output of the corresponding receiver at the data receptacle 175.

As shown in FIG. 1, the data 1000, in binary form, first passes through an encryption device 20 generating an encrypted signal 1020. The encrypted signal 1020 then passes through a forward error correction (FEC) encoding device 30 for encoding and thus generating an encoded signal 1030. A Reed-Solomon encoder may be used for the encoding. In other embodiments, a convolutional encoder, an LDPC/BCH encoder, or a Turbo Code encoder may be used for the encoding.

The encoded signal 1030 is then modulated by a modulator 40, generating a modulated signal 1040. To generate the modulated signal 1040, the signal is split into two streams, wherein every other bit is sent to each stream, forming an in-phase and a quadrature component, and then modulated in an ordinary manner, such as minimum shift keying, which results in a signal having both real and imaginary components. The modulator 40 may be, but is not limited to, a Quadrature Phase Shift Keying (QPSK), a Staggered Quadrature Phase Shift Keying (SQPSK), a Minimum Shift Keying (MSK), or any other modulator with different amplitude and phase shift keying capability.

The modulated signal 1040 is then complex multiplied at a first multiplier 45 by the output of the chaos generator 50, which results in a further modulated signal with constant amplitude but variable phase, called the chaotic modulated signal 1050. The chaos generator 50 may be an electrical component, logic device, a software encoded device, and/or any other hardware device to generate a chaotic signal. The chaotic modulated signal 1050 is fed back into the chaos generator 50 as an input. The result of this modulation at the chaos generator 50, including feedback of the chaotic modulated signal 1050 into the chaos generator 50, serves two purposes. The first purpose is to drive the input of the chaos generator 50 and the second purpose is to continue the chaotic modulated signal 1050 through the transmitter 10 to be transmitted to the receiver 100.

Before transmission over the channel 11 as a chaotic carrier signal, the chaotic modulated signal 1050 is multiplied at a second multiplier 55 by a sequence of positive or negative pulses corresponding to the PN sequence, as generated by a binary PN sequence generator 60. A PN sequence generator may be an electrical component, logic device, a software encoded device, and/or any other hardware device that generates a waveform of chips, wherein each chip is a pulse that is either positive or negative representing the binary value (1 or 0) in the PN sequence. A composite signal 1060 is generated. Each pulse may be referred to as a chip. The chaotic modulation has the effect of mixing the ordinary modulated signal within its bandwidth, while the PN sequence has the effect of spreading the bandwidth out over a large bandwidth depending on the chip rate.

The resulting composite signal 1060 may be then modulated onto a carrier frequency by a carrier frequency generator device 70 for transmission as a transmitted waveform 1100 over channel 11.

The exemplary structure of the receiver 100 is shown in FIG. 1. The received waveform 1200, as sent from the transmitter 10, is processed to recover and remove the carrier. The received waveform 1200, after arriving at the receiver 100, passes through a carrier frequency recovery device 170 that estimates the carrier frequency and phase and uses them to create a local reference which can be used by the receiver 100 to detect the complex envelope of the received waveform 1200.

The receiver 100 synchronizes the local copy of the carrier frequency and the PN sequence and multiplies each of these at a third multiplier 155 with the received waveform 1200 to cancel the spreading effect. A binary PN sequence generator 160 in the receiver 100 generates the same sequence as that of the binary PN sequence generator 60 in the transmitter 10. The PN sequence generator 60 in the transmitter 10 may be called a transmitter PN sequence generator and the PN sequence generator 160 in the receiver 100 may be called a receiver PN sequence generator. Multiplying, at the third multiplier 155, by the PN sequence de-spreads the signal, creating a de-spread signal 1260, but does not de-spread the noise, so that in this way the effect of the noise is limited on both the chaos synchronization and the data detection.

The resulting de-spread signal 1260 is then passed through a chaos generator 150. The chaos generator 150 in the receiver 100 may be of the same or similar construction and/or same or similar configuration as the chaos generator 50 in the transmitter 10. The chaos generator 50 may be called a transmitter chaos generator and the chaos generator 150 in the receiver 100 may be called a receiver chaos generator. The de-spread signal 1260 drives the chaos generator 150 to reproduce the chaotic carrier signal. The chaos generator 150 creates an estimate of the chaotic signal that was originally used for the modulation process in the transmitter 10. Because the chaotic modulated signal was the input to the chaos generator 50 in the transmitter 10, the chaos generator 150 in the receiver 100 will produce the same output (or a close approximation) when fed with a close estimate of the chaotic modulated signal, which is available in the form of the de-spread signal 1260. The chaos generator 150 thus reproduces a chaotic signal 1250.

The chaotic signal 1250 is complex conjugated by a complex conjugate device 180, generating a conjugated signal 1280. The complex conjugate device may be an electrical component, logic device, a software encoded device, and/or any other hardware device to generate a conjugated signal 1280. In some embodiments, the complex conjugate device 180 is made of digital components. The conjugated signal 1280 is then complex multiplied by a fourth multiplier 145 onto the de-spread signal 1260, creating the modulated signal 1240. Multiplying the conjugated signal 1280 with the de-spread signal 1260 cancels the chaotic modulation. As long as the received waveform 1200 has not been corrupted by too much noise the chaos generator 150 will produce a chaotic signal 1250 that when conjugated and complex multiplied with the de-spread signal 1260 will cancel the effects of the chaos. Because the chaos generator 150 exhibits chaotic behavior, its characteristic parameters must be known precisely in order to correctly receive the message. If, as in the case of an unintended receiver, the parameters are guessed closely but not precisely, then the output signal of the chaos generator 150, as shown in FIG. 1 as the de-spread signal 1260, will rapidly diverge from the output signal of the transmitter's chaos generator 50 making it ineffective in canceling the chaos.

Once the effects of chaos are cancelled, the modulated signal 1240 may then be received through a demodulator 140, or matched filter, and have the signal's forward error correction processing performed to improve its bit error rate performance. The demodulator 140 may use a matched filter made of digital components. Demodulation may include, but is not limited to, matched filtering, sampling, and/or equalization. Without canceling the chaos, receiving a signal may yield a bit error rate near fifty percent, which is no better than an arbitrary guess. The demodulated signal will comprise the data as originally sent through this estimation, and transmitted as the message estimate 1230.

The message estimate 1230 may then pass through the FEC decoding device 130 to improve the bit error rate, creating a decoded signal 1220. The decoding device 130 may be a Reed-Solomon decoder. In other embodiments, the decoding device 130 may be a hard decision Viterbi algorithm decoder, a soft decision Viterbi algorithm decoder, an LDPC/BCH decoder, a convolutional decoder, or a Turbo Code decoder.

Finally, the decoded signal 1220 may pass through a decryption device 120 and the final estimate of the message is provided as received data 1500.

Both the transmitter 10 and receiver 100 may be implemented using digital electronics. For example, the modulator 40 or demodulator 140, such as a MSK modulator, may be made of digital components. The chaos generator 50 in the transmitter 10, and/or the chaos generator 150 in the receiver 100, may be implemented with programmable digital components. By implementing digital components, switching the characteristic parameters or the entire structure of the chaos generator may be conducted through the use of reprogrammable chips rather than by switching physical components from within the transmitter 10 and/or receiver 100. Essentially, a software modification may be the only necessary change to change the "security key." Having to not switch out physical components makes the system practical and more efficient for in-field use.

Figure 3:
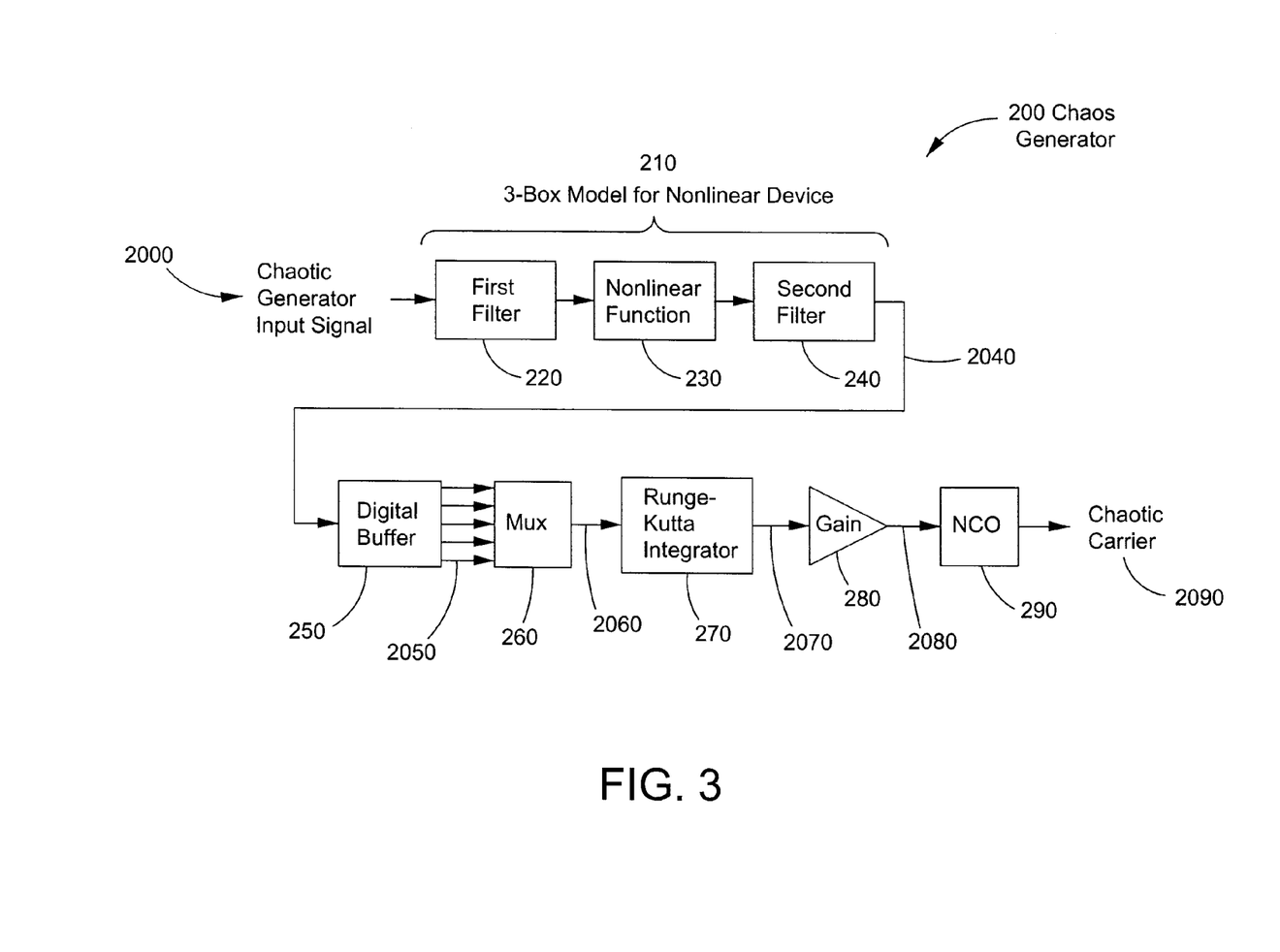
FIG. 3 shows the detailed structure of the chaos generator in at least one embodiment.

In other embodiments, the transmitter 10 may use analog components, except for the chaos generator 50. In these embodiments, the chaos generator 50 may have an analog-to-digital converter (ADC) at the input of the chaos generator 50 and a digital-to-analog converter (DAC) after an numerically controlled oscillator (NCO) integrated within the chaos generator 50 (and as shown in FIG. 3). The receiver 100 may use analog components except for the chaos generator 150, having a similar ADC and DAC arrangement integrated within.

In other embodiments, the PN sequence generator 60 in the transmitter 10 or the PN sequence generator 160 in the receiver 100 may perform multi-level PN sequencing.

Figure 2A:
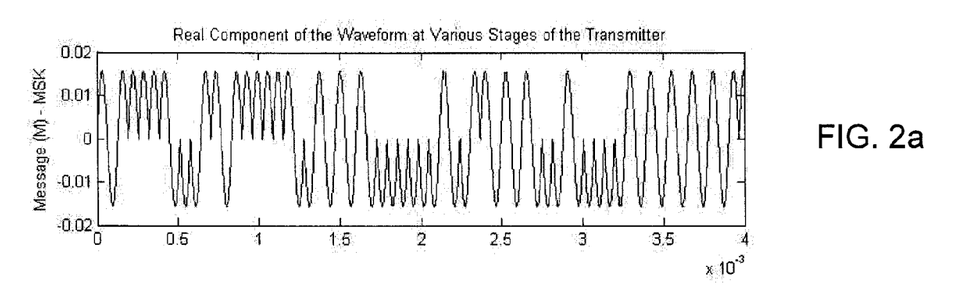
FIG. 2a shows an exemplary waveform from after data modulation in the transmitter in at least one embodiment.

FIG. 2a shows an exemplary waveform generated after data modulation in the transmitter 10 in at least one embodiment. The waveform shown in FIG. 2a may represent the modulated signal 1040 from FIG. 1. The exemplary waveform shown in FIG. 2a is generated using a MSK modulator.

Figure 2B:
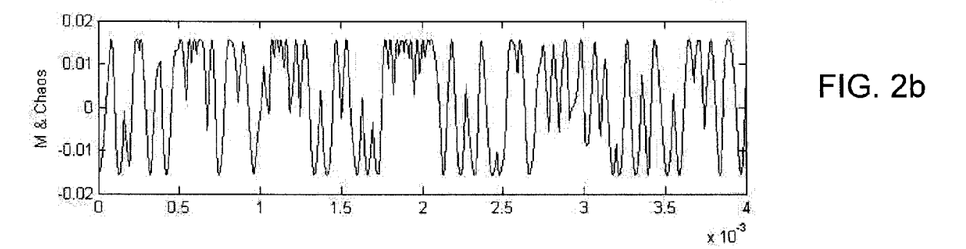
FIG. 2b shows an exemplary waveform from after chaos modulation in the transmitter in at least one embodiment.

FIG. 2b shows an exemplary waveform generated after chaos modulation in the transmitter 10 in at least one embodiment. The waveform shown in FIG. 2b may represent the chaotic modulated signal 1050 from FIG. 1.

Figure 2C:
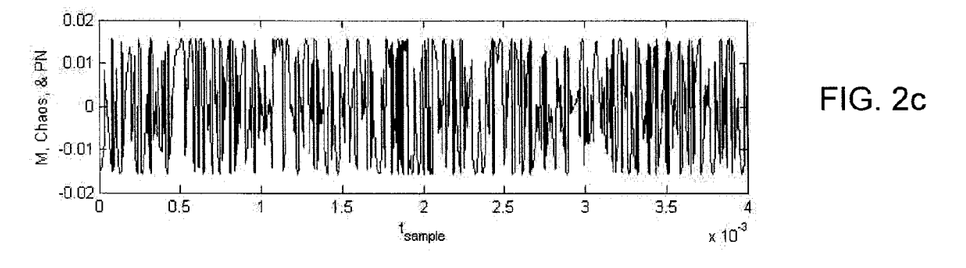
FIG. 2c shows an exemplary waveform from after PN sequence spreading operation in the transmitter in at least one embodiment.

FIG. 2c shows an exemplary waveform generated after PN sequence spreading operation in the transmitter 10 in at least one embodiment. The waveform shown in FIG. 2c may represent the composite signal 1060 from FIG. 1.

FIG. 3 shows the detailed structure of the chaos generator 200 that may be used in both the transmitter 10 and/or receiver 100 in at least one embodiment. The chaotic generator input signal 2000, entering the chaos generator 200, is a chaotic modulated signal. In the case of the transmitter 10, it is the output of the chaos generator 50, modulating the data-modulated signal. This is the chaotic modulated signal 1050 from FIG. 1. In the case of the receiver 100 it is the de-spread signal 1260 from FIG. 1.

The chaotic generator input signal 2000 first passes through a memory-less nonlinear device or other filter. As shown in FIG. 3, the chaotic generator input signal 2000 passes through a three-box model for a nonlinear device (NLD) 210. The three-box model for the NLD 210 comprises a first filter 220, a nonlinear function 230, and a second filter 240. The first filter 220 and second filter 240 may either be implemented as finite impulse response (FIR) filters, infinite impulse response (IIR) filters, or a combination of the two on a digital device, so that the coefficients in their structure may be changed by changing the configuration of the digital device by a software update. An FIR or IIR filter may be implemented in either or both the first filter 220 or second filter 240. The nonlinear function 230 may be sequenced between the two filters as shown in FIG. 3. The NLD 210 may be instantaneous. In some embodiments, the nonlinear function 230 may be implemented as a traditional equation in a digital form or as a lookup table, and thus may be reconfigured with a software update to the digital nonlinear device 210. Because the filters, including first filter 220, second filter 240, and nonlinear function 230 may easily be updated and since the three-box model for NLD 210 can model a wide range of nonlinear devices, a transmitter 10 or receiver 100 or both may easily be modified in the field to use a completely different nonlinearity in generating the chaotic signal in a chaos generator 200. In other embodiments, the NLD 210 may be instantaneous and/or may be a square law device. In other embodiments, the three-box model may be replaced by a two-box model having a cascade of filter and nonlinear device. In other embodiments, the three-box model may be replaced by a five-block model for the nonlinear function (a cascade of filter, nonlinear device, filter, nonlinear device, filter).

As shown in FIG. 3, after the chaotic generator input signal 2000 has been processed through the NLD 210, a filtered signal 2040 is generated. The filtered signal 2040 is then passed to a digital buffer 250. The digital buffer 250 allows the latency of the chaos generator 200 to be controlled as well as the opportunity to have multiple dependencies on the past state of the chaos generator 200. As shown in FIG. 3, a multiplexer 260 may be used for selecting samples 2050 from the digital buffer 250. A selected sample signal 2060 is then transmitted from the multiplexer 260. In some embodiments, a summation device, as alternative to the multiplexer 260 shown in FIG. 3, having multiple entries from the buffer may be used.

After the selected sample (or samples) signal 2060 is chosen from the buffer 250, the selected sample signal 2060 is passed into a Runge-Kutta integrator 270. The inherent latency of the NLD 210 plus the additional latency of the buffer 250 make the chaos generator's 200 characteristic differential equations that of the type of equations known as delay differential equations, which depend on past values of the system as well as its current values. In effect, the digital implementation of the Runge-Kutta algorithm is used for solving differential equations with variable coefficients for the state variables and input function in the differential equations. The Runge-Kutta integrator 270, uses a digital form of the Runge-Kutta algorithm to solve a series of ordinary differential equations with a forcing function equal to the input sample signal 2060, and the integrator output signal equal to a state variable of the system of equations. For this purpose, embodiments may use other integration algorithms after they are digitally implemented. The state variables can be represented in vector form as shown in equation (1).

$$\vec{x}(t) = \begin{pmatrix} x_1(t) \\ x_2(t) \\ \vdots \\ x_n(t) \end{pmatrix}, \quad (1)$$

The system of equations can be written in terms of the first derivative of each state variable, a coefficient matrix that describes how the state variables are used, the state variables, a coefficient vector describing how the input function is used, and the input function. This is shown in equations (2) and (3).

$$\frac{d}{dt}[\vec{x}] = A\vec{x} + c \cdot g(t), \quad (2)$$

$$x_1(t):\text{output}, \; g(t):\text{input}, \quad (3)$$

Changing these coefficients to yield a different structure and therefore a different chaotic signal only requires a software update to the transmitter or receiver. The number of differential equations is flexible with an upper bound set by the particular digital device used and the lower bound being three so that a third order differential equation is obtained. Generally, an increase in the number of differential equations used increases the complexity of the chaotic system from the chaos generator 200. A discrete version of the Runge-Kutta algorithm is performed on the differential equation described in equation (2) as shown in equations (4) through (8).

$$k_1 = A\vec{x}_{n-1} + c \cdot g_{n-1}, \quad (4)$$

$$k_2 = A\left(\vec{x}_{n-1} + \frac{\Delta t}{2} \cdot k_1\right) + c \cdot g_{n-\frac{1}{2}}, \quad (5)$$

$$k_3 = A\left(\vec{x}_{n-1} + \frac{\Delta t}{2} \cdot k_2\right) + c \cdot g_{n-\frac{1}{2}}, \quad (6)$$

$$k_4 = A\left(\vec{x}_{n-1} + \Delta t \cdot k_3\right) + c \cdot g_n, \quad (7)$$

$$\vec{x}_n = \vec{x}_{n-1} + \frac{\Delta t}{6}(k_1 + 2k_2 + 2k_3 + k_4), \quad (8)$$

$$t = n \cdot \Delta t, \, n\text{:sample time}, \Delta t\text{:step size}, \quad (9)$$

The use of a half in a subscript indicates interpolation of the input signal.

In other embodiments, the differential equations may correspond to Lorenz differential equations. In other embodiments, the differential equations may correspond to Percora-Carol differential equations. In other embodiments, the differential equations may correspond to another set of chaotic difference equations. In other embodiments, the Runge-Kutta algorithm may be replaced with a trapezoidal integration algorithm applied to the differential equations. In other embodiments, the Runge-Kutta algorithm may be replaced with Simpson's rule for integration applied to the differential equations. In other embodiments, the Runge-Kutta algorithm may be replaced with a different form of integration of the differential equations.

As shown in FIG. 3, the integrated signal 2070 then passes from Runge-Kutta integrator 270 to a variable gain control 280. The variable gain control 280 scales the integrated signal 2070. A scaled signal 2080 is generated. The scaled signal 2080 drives the phase of a numerically controlled oscillator (NCO) 290, creating a constant amplitude but phase varying signal. This phase varying signal is then used as a chaotic carrier 2090 to perform the chaotic modulation in the transmitter 10 (see chaotic modulated signal 1050 in FIG. 1) or complex conjugated and then used to perform the chaotic demodulation in the receiver 100 (see chaotic signal 1250 in FIG. 1).

The structure of the chaos generator 200 produces the same chaotic carrier 2090 in the transmitter 10 as in the receiver 100 for the following reasons:

1) The structure of the chaos generator in the transmitter 10 and receiver 100 is similar (e.g. components in both chaos generators may be similar, ordering of circuits and/or components in both may be similar, certain components in both may be identical, or the features provided by both may be similar);
2) The characteristics parameters of the chaos generator 200 in the transmitter 10 and receiver 100 are nearly similar;
3) The input signal to the chaos generator 200, the chaotic generator input signal 2000, is nearly similar in both the transmitter 10 and receiver 100.

The first two properties, listed above, may be based on the design and implementation of the chaos generator 200. The third property is only true based on the way the chaos generator 200 is used and based on the characteristics of the channel 11 (see FIG. 1). The chaotic generator input signal 2000 for the chaos generator 200 in the transmitter 10 is chosen to be a reproducible signal in the receiver 100, namely the signal that exists just before the PN Sequence spreading operation. As long as the carrier recovery and PN Sequence de-spreading are achieved in the receiver 10, the only corruption of this signal from the original chaos modulated signal in the transmitter 10 is due to the channel 11. The dominant cause of this corruption is the noise of the channel 11 which is at a much lower level than would have been possible without the PN sequence due to the de-spreading operation.

Due to the presence of the noise, the first filter 220 in the three-box model of the NLD 210 should be chosen to reduce the amount of noise that can influence the chaos generator 200. Typically the first filter 220 in the NLD 210 has band limiting characteristics. This noise causes a somewhat increased bit error rate (BER) during detection due to the imperfect synchronization, but analysis by simulation has shown that an increase in signal to noise ratio (SNR) is able to deliver a decreased BER. Additionally, an FEC may be added to compensate for this increased BER without adding additional power to the system, at the transmitter 10 or the receiver 100. This is desirable to maintain the LPD/LPI characteristics of the signal. For a system that uses an improperly tuned chaos generator, namely by an unintended receiver, it is not possible to maintain synchronization even with the benefit of the PN Sequence lowering the noise floor, and so the BER is significantly elevated beyond what FEC can repair. This means that a simple PN sequence based system that could not previously use FEC due to the danger of an unintended receiver leveraging the FEC to intercept the signal can now add both the chaotic modulation and the FEC.

The chaos generator 200 may be an all digital implementation, allowing for easily switching between "security keys" to maintain security. An all digital implementation allows for in-field changes to software to switch to a new set of parameters which act as the security key. This is in comparison to having to carry into the field a limited number of physical components and having to make hardware changes in the field to achieve the parameter switching for a security key which is inefficient.

The characteristics of the chaos generator 200 that may be used to create a unique configuration and thus "security key" include, but are not limited, to the first filter 220 and/or second filter 240 coefficients before and after the nonlinear function 230. Other characteristic that may be configured include the nonlinear function's 230 characteristics. Other characteristics that may be configured include the size, location, and number of samples from the digital buffer 250. Other characteristics that may be configured may include the coefficients used in the algorithm of the Runge-Kutta integrator 270 and/or the gain coefficient for the variable gain control 280 preceding the NCO 290.

In some embodiments, the chaos generator 200 is made of all digital components, except for a voltage controlled oscillator after a DAC in place of any numerically controlled oscillator which may be located before the DAC, if the chaos generator 200 integrates an analog-to-digital converter (ADC) at the input of the chaos generator 200. In some embodiments, the components of the chaos generator 200 may be rearranged into a different order.

Figure 4:
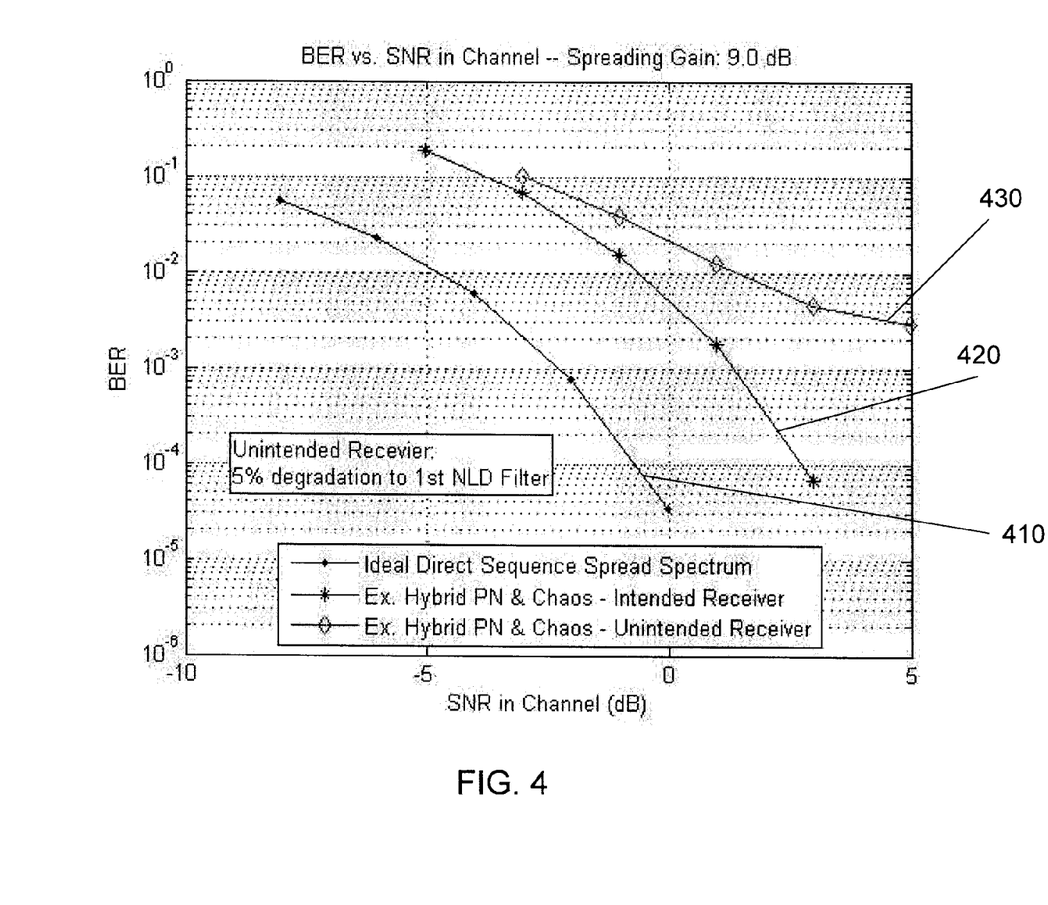
FIG. 4 shows Bit Error Rate (BER) curves for an intended receiver versus for an unintended receiver using the hybrid PN sequence and chaos system and methodology in at least one embodiment.

FIG. 4 shows BER curves for an intended receiver versus for an unintended receiver using the hybrid PN sequence and chaos system and methodology in at least one embodiment. The BER curve is a standard figure of merit in communication systems. BER is achieved for different signal to noise ratios (SNR). The signal and noise power are both measured over the channel bandwidth. The ideal direct sequence spread spectrum 410, intended receiver curve 420, and unintended receiver curve 430 are shown. As an example of an unintended receiver, a five percent degradation was applied to the first filter of the NLD and the rest of the structure was "guessed" correctly. The performance of the intended receiver curve 420 more closely matches the ideal direct sequence spread spectrum 410 than the unintended receiver curve 430 in using the hybrid PN sequence and chaos system and process. Additionally, the unintended receiver curve 430 "flares" out eliminating the possibility of finding reasonable conditions where lower more favorable BER could be achieved by the unintended user.

Figure 5:
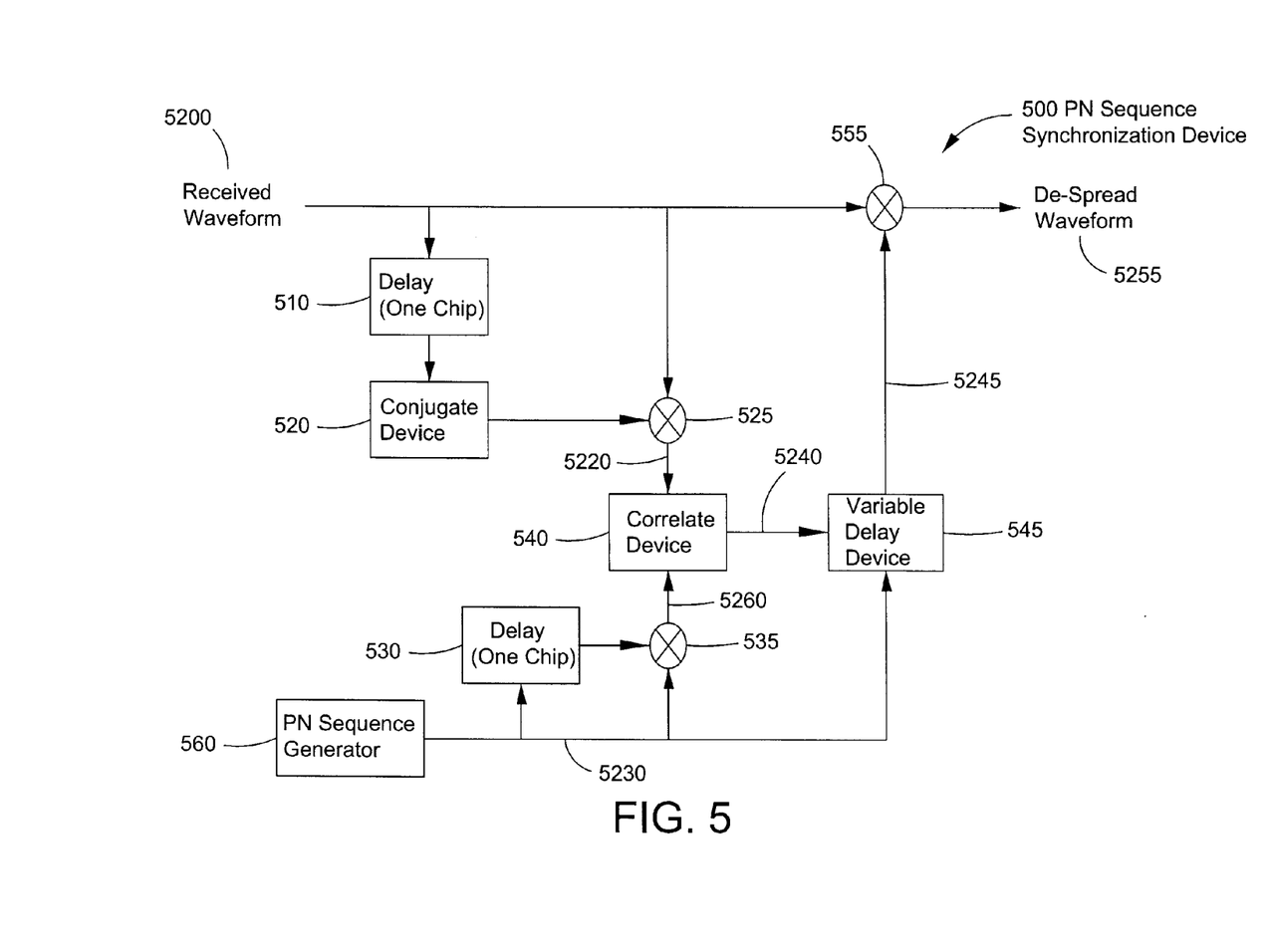
FIG. 5 shows an exemplary system and method for synchronizing the PN sequence with the received waveform at the receiver in at least one embodiment.

FIG. 5 shows an exemplary system and method for synchronizing the PN sequence with the received waveform 1200 at the receiver 100 in FIG. 1 in at least one embodiment. FIG. 5 shows a PN sequence synchronization device 500 where a first delay 510, second delay 530, complex conjugate device 520, and a complex multiply algorithm are used to eliminate the chaos and data portions of the received waveform 5200. The received waveform 5200 is processed to determine the delay necessary to synchronize the PN sequence generator 560. The PN sequence can be synchronized by complex multiplying the received waveform 5200 at a first multiplier 525 by the waveform 5200 delayed by the duration of one chip at the first delay 510 and complex conjugated by the conjugate device 520, as shown in FIG. 5, to create a processed received signal 5220. This has the effect of canceling the data and chaos from the waveform 5200 but leaving a new PN sequence and the noise. A PN sequence generator output signal 5230 is complex multiplied at a second multiplier 535 by the generator output signal 5230 delayed by the duration of another one chip at a second delay 530 to create a local copy 5260 used to cross correlate with the processed received signal 5220 at the correlate device 540 to determine the amount of delay in the unprocessed sequence forming control signal 5240. The control signal 5240 may then be transmitted to a variable delay device 545. The control signal 5240 represents the amount of delay used by the variable delay device 545. At a third multiplier device 555, the received waveform 5200 is multiplied to the delayed PN sequence generator output signal 5245 to generate the de-spread waveform 5255. This de-spread waveform 5255 may correlate to the de-spread signal 1260 in FIG. 1.

Although the disclosure has been described with reference to exemplary embodiments, it is not limited thereto. Those skilled in the art will appreciate that numerous changes and modifications may be made to the preferred embodiments and that such changes and modifications may be made without departing from the true spirit of the disclosure. It is therefore intended that the appended claims be construed to cover all such equivalent variations as fall within the true spirit and scope of the disclosure.

What is claimed is:

1. A covert communication system comprising:
   a transmitter for sending a covert signal, the transmitter comprising:
      a modulator to modulate a data signal entering the transmitter to create a transmitter modulated signal,
      a first transmitter multiplying device coupled to the modulator to multiply the transmitter modulated signal with a chaotic signal to create a chaotic modulated signal,
      a transmitter chaos generator coupled to the first multiplying device to generate the chaotic signal, wherein the chaotic modulated signal reenters the transmitter chaos generator;
      a transmitter pseudo-random noise sequence generator to generate a transmitter pseudo-random noise sequence, and
      a second transmitter multiplying device coupled to the first multiplying device and to the transmitter pseudo-random noise sequence generator to multiply the chaotic modulated signal with the transmitter pseudo-random noise sequence to create the covert signal; and
   a receiver for receiving the covert signal, wherein the receiver comprises:
      a receiver pseudo-random noise sequence generator to generate a receiver pseudo-random noise sequence identical to the transmitter pseudo-random noise sequence,
      a first receiver multiplying device coupled to the receiver pseudo-random noise sequence generator to multiply the covert signal with the pseudo-random noise sequence to create a de-spread signal,
      a receiver chaos generator coupled to the first receiver multiplying device to generate a receiver chaotic signal, wherein the receiver chaos generator is of similar configuration as the transmitter chaos generator and wherein the de-spread signal enters the receiver chaos generator,
      a complex conjugate device coupled to the receiver chaos generator to complex conjugate the receiver chaotic signal to generate a conjugated signal,
      a second receiver multiplying device coupled to the first receiver multiplying device and the complex conjugate device to multiply the conjugated signal to the de-spread signal to create a receiver modulated signal, and
      a demodulator coupled to the second receiver multiplying device to demodulate the receiver modulated signal to generate a received data signal approximating the data signal entering the transmitter.

2. The system of claim 1, wherein the receiver further comprises a pseudo-random noise sequence synchronization device comprising:
   a delay device;
   a supplement complex conjugate device; and
   a complex multiply algorithm; and
   wherein the pseudo-random noise sequence synchronization device determines a delay necessary to synchronize the receiver pseudo-random noise sequence with the transmitter pseudo-random noise sequence.

3. The system of claim 1, wherein the transmitter chaos generator further comprises:
   a non-linear device to receive the chaotic signal and generate a filtered signal;
   a buffer coupled to the non-linear device to sample the filtered signal to generate sampled signals;
   a selection device coupled to the buffer for selecting from sampled signals to generate a selected sampled signal;
   an integrator coupled to the selection device to solve differential equations with variable coefficients for state variables as a function of the selected sampled signal to generate an integrated signal;
   a variable gain control coupled to the integrator to scale the integrated signal; and
   a numerically controlled oscillator coupled to the variable gain control to generate a constant amplitude and varying phase within the chaotic signal.

4. The system of claim 3 wherein the non-linear device comprises:
   a first filter;
   an instantaneous nonlinear function coupled to the first filter; and
   a second filter coupled to the instantaneous nonlinear function.

5. The system of claim 4 wherein the first filter is selected from a finite impulse response filter or an infinite impulse response filter.

6. The system of claim 4 wherein the second filter is selected from a finite impulse response filter or an infinite impulse response filter.

7. The system of claim 4 wherein the instantaneous non-linear function is a square law device.

8. The system of claim 4 wherein the instantaneous non-linear function is a lookup table device.

9. The system of claim 1, wherein the transmitter chaos generator is digitally programmable.

10. The system of claim 1, wherein the complex conjugate device is digital.

11. The system of claim 1, wherein the modulator is selected from a minimum shift keying modulator, a staggered quadrature phase shift keying modulator, or a modulator with different amplitude and phase shift keying.

12. The system of claim 1, wherein the transmitter further comprises an encoder coupled to the modulator for encoding the data signal before the data signal is modulated and wherein the receiver further comprises a decoder coupled to the demodulator to decode the demodulated waveform to generate a decoded waveform.

13. The system of claim 12, wherein the encoder is selected from a Reed-Solomon encoder, a convolutional encoder, a LDPC/BCH encoder, or a Turbo Code encoder.

14. The system of claim 12, wherein the decoder is selected from a Reed-Solomon decoder, convolutional decoder, a hard decision Viterbi algorithm decoder, a soft-decision Viterbi algorithm decoder, a LDPC/BCH decoder, or a Turbo Code decoder.

15. The system of claim 12, wherein the transmitter further comprises an encryption device coupled to the encoder for encrypting the data signal before encoding and wherein the receiver further comprises a decryption device coupled to the decoder to decrypt the decoded waveform.

16. The system of claim 3, wherein the transmitter further comprises an analog-to-digital converter coupled to the modulator to convert the data signal from analog to digital and a digital-to-analog converter coupled to the numerically controlled oscillator to convert the chaotic signal from digital to analog.

17. The system of claim 1, wherein the transmitter further comprises a carrier frequency generator device coupled to the second transmitter multiplying device to transmit the covert signal on a carrier frequency and wherein the receiver further comprises a carrier frequency recovery device to remove the carrier frequency from the covert signal.

18. The system of claim 1, wherein the selection device is selected from a multiplexer or a summation device.

19. A method for covertly communicating between a transmitter and a receiver comprising:
  receiving a data signal at the transmitter;
  modulating the data signal at a modulator in the transmitter to create a transmitter modulated signal;
  generating a chaotic signal from a transmitter chaos generator in the transmitter;
  multiplying the modulated signal with the chaotic signal in the transmitter to create a transmitter chaotic carrier signal;
  generating a transmitter pseudo-random noise sequence from a transmitter pseudo-random noise sequence generator in the transmitter;
  multiplying the transmitter chaotic carrier signal to the transmitter pseudo-random noise sequence in the transmitter to create a covert signal;
  transmitting the covert signal over a channel from the transmitter;
  receiving the covert signal transmitted from the transmitter over the channel at the receiver;
  generating a receiver pseudo-random noise sequence from a receiver pseudo-random noise sequence generator identical to the transmitter pseudo-random noise sequence;
  multiplying the receiver pseudo-random noise sequence to the covert signal in the receiver to create a de-spread signal;
  generating a receiver chaotic carrier signal at a receiver chaos generator, wherein the receiver chaos generator is of similar configuration as the transmitter chaos generator;
  complex conjugating the receiver chaotic carrier signal from the receiver chaos generator at a complex conjugate device to generate a conjugated signal in the receiver;
  multiplying the conjugated signal to the de-spread signal to create a receiver modulated waveform; and
  demodulating the receiver modulated waveform at a demodulator in the receiver to generate a received data signal approximating the data signal received at the transmitter.

20. The method of claim 19, wherein generating a chaotic signal from the transmitter chaos generator in the transmitter further comprises:
  receiving the chaotic signal at a non-linear device in the transmitter chaos generator;
  filtering the chaotic signal at the non-linear device to create a filtered signal;
  sampling the filtered signal at a digital buffer in the transmitter chaos generator;
  selecting from the sampled signals at a selection device to generate a selected sampled signal;
  integrating the selected sample signal at an integrator for solving differential equations with variable coefficients for state variables as a function of the selected sampled signal to generate an integrated signal;
  scaling the integrated signal at a variable gain control; and
  generating a constant amplitude and varying phase in the chaotic signal at a numerically controlled oscillator.

21. The method of claim 20, wherein integrating the selected sample signal further comprises solving for Lorenz differential equations.

22. The method of claim 20, wherein integrating the selected sample signal further comprises integrating with trapezoidal differential equations.

23. The method of claim 20, wherein integrating the selected sample signal further comprises integrating under Simpson's rule for differential equations.

* * * * *